US010997370B2

(12) United States Patent
Scally et al.

(10) Patent No.: US 10,997,370 B2
(45) Date of Patent: *May 4, 2021

(54) HYBRID CLASSIFIER FOR ASSIGNING NATURAL LANGUAGE PROCESSING (NLP) INPUTS TO DOMAINS IN REAL-TIME (71) Applicant: Oath Inc., New York, NY (US)

(72) Inventors: Jonathan R. Scally, Arlington, VA (US); Nicholas L. Cassimatis, Sunnyvale, CA (US); Richard Caneba, Sunnyvale, CA (US); Naveen Sundar Govindarajulu, San Jose, CA (US)

(73) Assignee: Verizon Media Inc., New York, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/180,407

(22) Filed: Nov. 5, 2018

(65) Prior Publication Data
US 2019/0073357 A1 Mar. 7, 2019

Related U.S. Application Data (63) Continuation of application No. 15/239,219, filed on Aug. 17, 2016, now Pat. No. 10,120,861.

(51) Int. Cl.
G06F 40/30 (2020.01)
G06F 16/35 (2019.01)
(Continued)

(52) U.S. Cl.
CPC .......... *G06F 40/30* (2020.01); *G06F 16/3344* (2019.01); *G06F 16/35* (2019.01); *G06F 16/353* (2019.01); *G06F 40/284* (2020.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

6,865,528 B1 * 3/2005 Huang .................. G10L 15/197
704/257
7,031,908 B1 * 4/2006 Huang ................ G10L 15/1815
704/9
(Continued)

*Primary Examiner* — Lamont M Spooner
(74) *Attorney, Agent, or Firm* — Cooper Legal Group, LLC (57) ABSTRACT Systems and methods for domain classification in natural language processing based on domains are disclosed. The method includes generating a trigram corpus for the purpose of classification based on a trigram analysis of a domain model containing a hierarchical ontology and semantic construction that maps patterns of semantic tokens to syntactic patterns. An input string is parsed within each domain, tokenized in each domain. The resulting trigrams for the input text in each domain are looked up in the corresponding trigram corpus to determine the relevancy of each domain to the input text. The input string is thus classified based on the relevancy determination. The systems and methods avoids having to rely on existing annotated domain corpora for classification and allows for fast regeneration of the classifier when domain models are under frequent update and development.

20 Claims, 10 Drawing Sheets (51) Int. Cl.
*G06F 16/33* (2019.01)
*G06F 40/284* (2020.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2775; G06F 40/211; G06F 40/253; G06F 40/268; G06F 40/284; G06F 40/30
USPC .................................................. 704/1, 9, 10
See application file for complete search history.

(56) References Cited

U.S. PATENT DOCUMENTS

| | | | |
|---|---|---|---|
| 8,533,223 B2 * | 9/2013 | Houghton | G06F 40/284 707/776 |
| 8,818,795 B1 * | 8/2014 | Cassimatis | G06F 40/30 704/9 |
| 9,053,089 B2 * | 6/2015 | Bellegarda | G06F 40/30 |
| 9,213,687 B2 * | 12/2015 | Au | G06F 40/253 |
| 9,519,859 B2 * | 12/2016 | Huang | G06F 16/951 |
| 2008/0275694 A1 * | 11/2008 | Varone | G06F 40/30 704/9 |
| 2011/0231394 A1 * | 9/2011 | Wang | G06F 16/90332 707/723 |
| 2012/0166180 A1 * | 6/2012 | Au | G06F 40/253 704/9 |
| 2014/0136511 A1 * | 5/2014 | Hughes | G06F 16/901 707/714 |
| 2015/0205783 A1 * | 7/2015 | Anisimovich | G06F 40/44 704/2 |
| 2015/0248476 A1 * | 9/2015 | Weissinger | H04L 65/60 707/737 |
| 2016/0117386 A1 * | 4/2016 | Ajmera | G06F 16/35 707/740 |
| 2016/0224893 A1 * | 8/2016 | Parker, Jr. | G06N 5/02 |
| 2016/0357728 A1 * | 12/2016 | Bellegarda | G06F 40/30 |
| 2017/0147585 A1 * | 5/2017 | Kleindienst | G06F 16/2455 |

* cited by examiner

HYBRID CLASSIFIER FOR ASSIGNING NATURAL LANGUAGE PROCESSING (NLP) INPUTS TO DOMAINS IN REAL-TIME

CROSS-REFERENCE

This application claims priority to and is a continuation of U.S. application Ser. No. 15/239,219, filed on Aug. 17, 2016, entitled "HYBRID CLASSIFIER FOR ASSIGNING NATURAL LANGUAGE PROCESSING (NLP) INPUTS TO DOMAINS IN REAL-TIME", the entirety of which is incorporated herein by reference and which is related to U.S. Pat. No. 8,818,795, titled "Method and System for Using Natural Language Techniques to Process Inputs", U.S. patent application Ser. No. 15/169,101 titled "Real Time Parsing and Suggestions from Pre-Generated Corpus with Hypernyms", filed on May 31, 2016, and U.S. patent application Ser. No. 15/228,610 titled "Hybrid Grammatical and Ungrammatical Parsing", filed Aug. 4, 2016, the entireties of which are herein incorporated by reference.

BACKGROUND

Natural Language Processing (NLP) of an input text or query may be performed more accurately and more efficiently within a domain having a specific and limited set of vocabulary and linguistic constructions. A system for NLP may include multiple domains. Each domain handles input texts that deal with a specialized area of inquiry. The input text thus may need to be assigned to one or more domains by a domain classifier prior to semantic processing with a domain. Domain classification may be based on machine learning using training corpora developed from bodies of existing input text and their expert-annotated domain assignment. Some domains may be relatively "cold" in that no statistically sufficient corpora may exist for these domains and it may be economically or technically infeasible to quickly develop expert annotated corpora for these domains upon deployment. In addition, adding or removing features in a domain over time may require retraining. Further, a domain may need to be customized to certain subclasses of users with each subclass needing different training.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
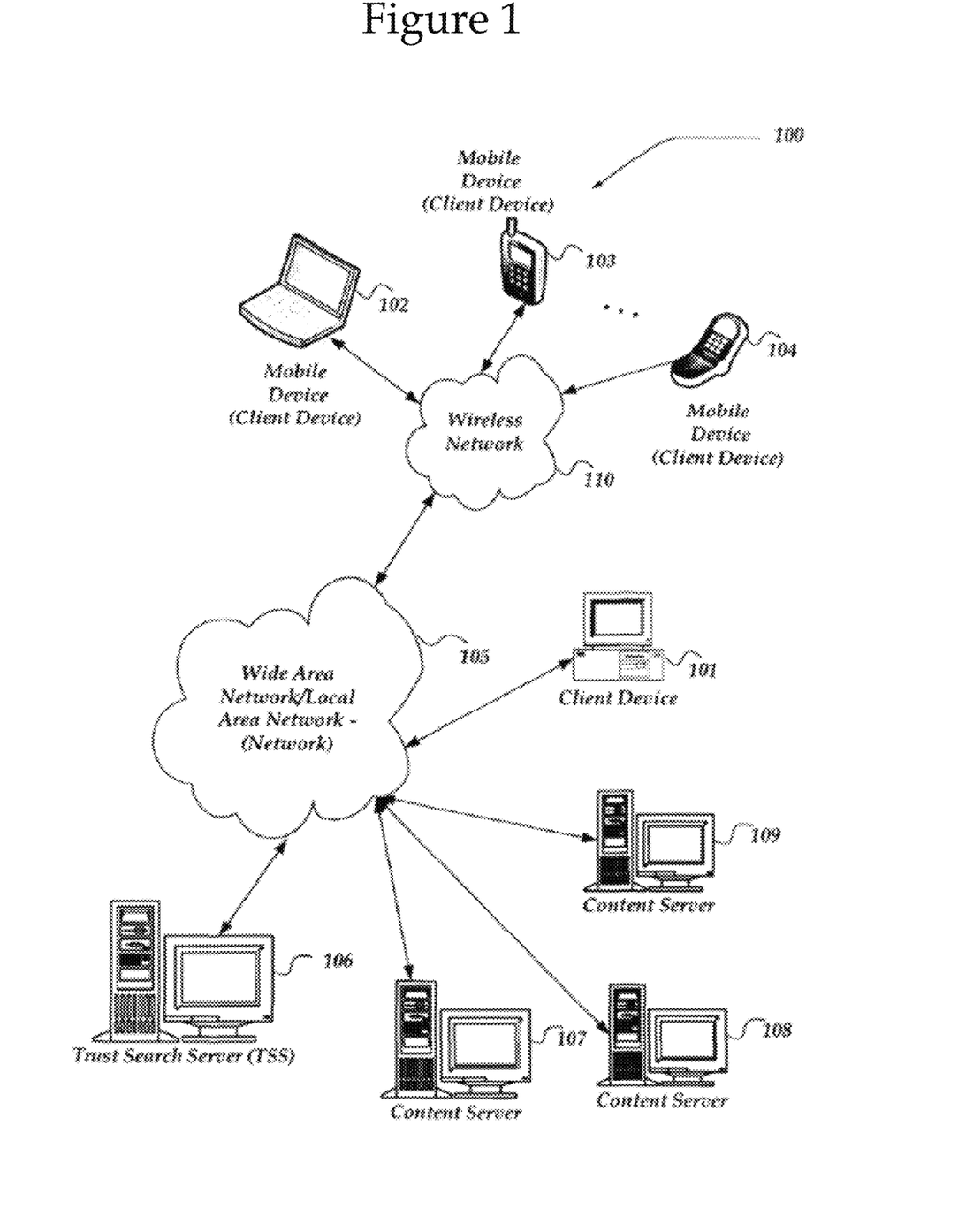
FIG. 1 shows a network system for NLP processing.

FIG. 1 is a schematic diagram illustrating an example embodiment of a system 100 that may be used for Natural Language Processing. Other embodiments that may vary, for example, in terms of arrangement or in terms of type of components, are also intended to be included within claimed subject matter. As shown in FIG. 1, the system 100, for example, includes a variety of networks, such as local area network (LAN)/wide area network (WAN) 105 and wireless network 110, a variety of devices, such as client device 101, mobile devices 102, 103, and 104, and a variety of servers such as content servers 107, 108, and 109, and search server 106.

The network 100 may couple devices so that communications may be exchanged, such as between a client device, a search engine, and an ad server, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wireline type connections, wireless type connections, or any combination thereof. Likewise, subnetworks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Figure 2:
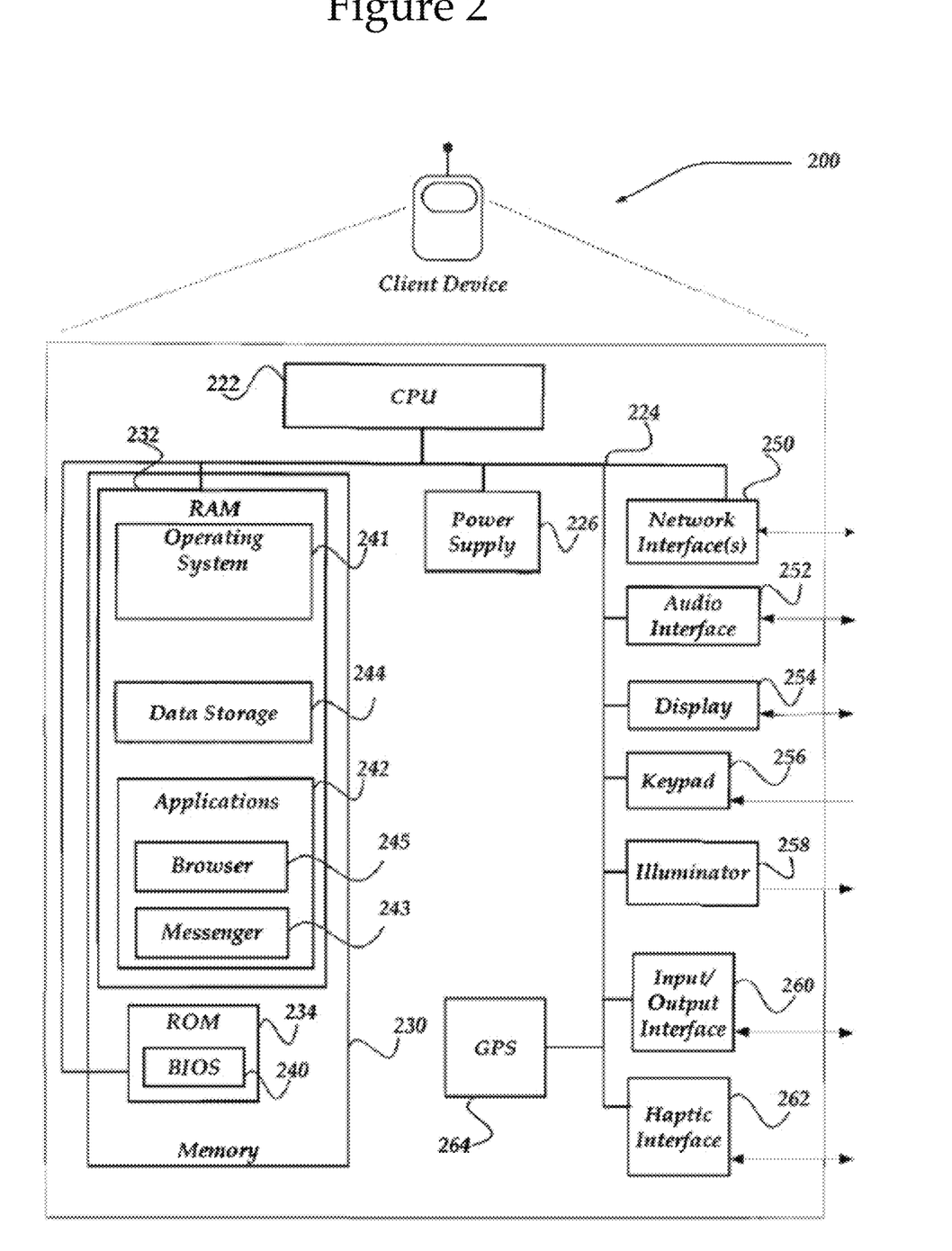
FIG. 2 shows a block diagram of a domain model.

FIG. 2 illustrates an example schematic of an embodiment of a computing device 200. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

A server is a computing device 200 that provides services, such as search services, indexing services, file services, email services, communication services, and content services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Various components of the system 100 (FIG. 1) may be involved in different aspects of NLP. For example, corpora for various machine-learning processes may be developed by one or more of the servers in the system 100 and stored in one or more of the servers or in the SAN. The client devices and the mobile devices 101-104 may be configured to obtain user input query texts for NLP and communicate the input query texts to the search server 106. The search server 106 may be configured to perform, for example, parsing and tokenization of the input strings, determination of semantics from the corpora stored in the servers or in the SAN, and search of contents in the content servers 107-109 based on semantics rather than Boolean logic of strings in the input texts. The user input query texts may be obtained via various interfaces on the client devices, including but not limited to keyboard, touch screen/touch pad, and microphone. For example, a client device may employ an input interface on a touch screen or a touch pad for a user to handwrite intended input query text and software designed to recognize and convert the handwritten pattern into text. For another example, a client device may include a microphone for receiving voice input from a user and speech recognition software to convert the input voice into text.

NLP for ascertaining semantics of input text may be performed in a set of domains. Each domain may handle input texts that deal with a specialized area of inquiry. For example, inquiries about place to eat maybe confined to a restaurant domain. Likewise, inquiries about a place to stay may be confined to a domain of hotels. Compartmentalized NLP based on domains may be more accurate and efficient in identifying semantics of an input string. In addition, each individual domain may be modeled independently by developers and may be modified and improved upon more speedily without affecting other domains. For example, a provider of web search for travel information may include domains each modeled for hotel rooms, flights, restaurants, or ground transportation independently.

Figure 3:
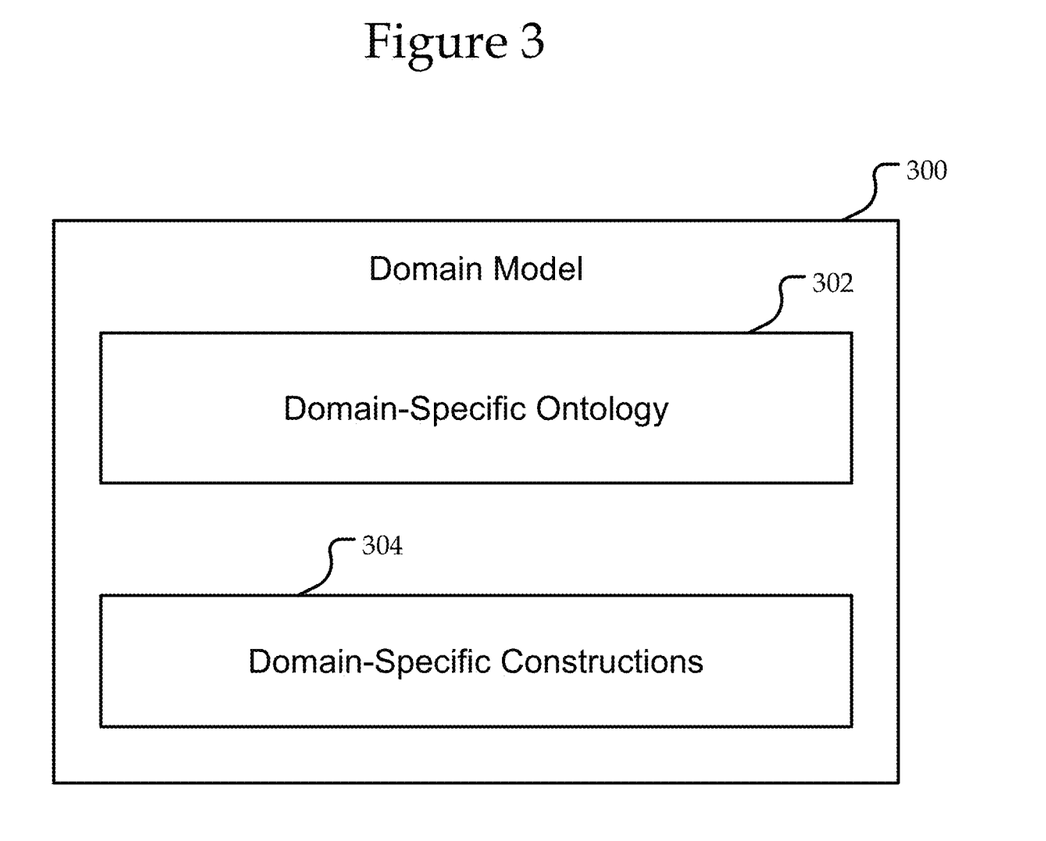
FIG. 3 illustrates an exemplary ontology tree of a domain.

FIG. 3 illustrates an exemplary model 300 for a domain for restaurant that may be used for NLP and for determining semantics of an input text within the domain. The model 300 may specify a domain-specific ontology 302 and provide a set of domain-specific constructions 304 that map a permissible set of semantic patterns to syntactic patterns. The syntactic patterns may be domain-specific or may be defined in a domain-independent way and may be shared by multiple domains.

The domain-specific ontology 302, herein referred to as the "ontology", may include a collection of semantic vocabulary that is specific to the domain and likely be part of a query for information relevant to the domain. The developers of the domain may construct, modify, and improve upon the ontology 302 in ways they see fit and at any time. Each item of the ontology 302 may be related to one or more other items in the same ontology. The ontology may thus be specified, for example, in hierarchical levels, such as ontology trees or forest.

For example, the ontology of a domain modeled to process inquiries intended for restaurant information may be specified as:

```
"name": "RestaurantSearch",
"ontology": [
    {
        "id" : "SearchableEntity"
        "subcategories": ["RestaurantEntity", "Cuisine"]
    },
    {
        "id" : "LocationEntity"
        "subcategories": ["Downtown", "Pier", "Airport", "City"]
    },
    {
        "id" : "RestaurantEntity"
        "subcategories": ["RestaurantType", "Restaurant"]
    },
    {
        "id" : "RestaurantType"
        "subcategories": ["Cafe", "Bar", "Deli"]
    },
    {
        "id" : "Cuisine"
        "subcategories": ["SpecificCuisine", "Food", "Meal"]
    },
    {
        "id" : "SpecificCuisine"
        "subcategories": ["Afghan", "African", "American", ...,
"British", ..., "Italian", ..., "Vietnamese"]
    },
    {
        "id" : "Actions"
        "subcategories": ["Serve", "Order", "Open"]
    }]
```

Figure 4:
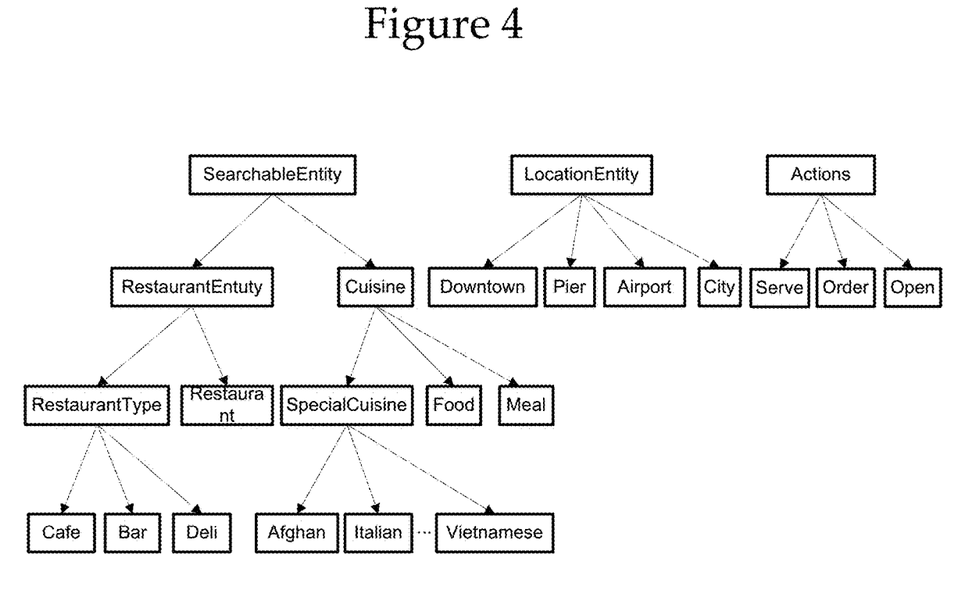
FIG. 4 illustrates exemplary hierarchical trees.

The ontology above specifies, using the "subcategories" identifier, multiple hierarchical trees as shown in FIG. 4. Every one of these semantic nodes in the trees may be considered as a semantic token of the model for the domain. A particular token in the tree may have multiple levels of subcategory tokens below. The lowest levels of a particular token are the leaf levels of the token. For example, the leaf level tokens of "Cuisine" in FIG. 4 are "Afghan", "Italian", . . . , "Vietnamese", "Food", and "Meal". These lowest level tokens may or may not be at the same hierarchical levels. For example, "Afghan" and "Italian" are at the same level whereas "Afghan" and "Food" are at different levels. In some situation as will be described below, the first level above a semantic token having at least one leaf may need to be identified. For example, the level identified by "SpecialCuisine", "Food" "Meal" has leaves ("Food" and "Meal") and is the first level with leaf under the semantic token "Cuisine". In the case of "SpecialCuisine", there might be hundreds of valid options that are listed in a domain. In this situation, where the number of leaf nodes exceeds a predefined limit (for example 10), it may be advantageous to define an "effective leaf" one level above the leaf node. A semantic token that is at this level but is not a true leaf (they have lower level hierarchical levels below them) may be referred as "effective leaf".

Returning to FIG. 3, the domain-specific constructions 304 may map permissible semantic tags or tokens to syntactic pattern that is either domain specific or domain independent. An example of a construction may be:

```
{
    "id": " RestaurantEntity_LocationEntity_Serve_Food",
    "type": "N_NP_V_N",
    "pattern": " RestaurantEntity LocationEntity Serve Food ",
    "meaning": {
        "referent": {
            "Relation":"Relation_14",
            "HasRestaurant": "RestaurantEntity",
            "HasLocation": "LocationEntity",
            "Serve": "Food"
        }
    }
},
```

The example construction above has a syntactic pattern specified by "type" with a mapping semantic pattern "RestaurantEntity_LocationEntity_Serve_Food". The semantic tags or tokens "LocationEntity" is at the first level of the hierarchy in FIG. 4. The semantic tags or tokens "RestaurantEntity" and "Serve" are at the second level of the hierarchy in FIG. 4. The semantic tag or token "Food" is at the third level of the hierarchy of FIG. 4. The example above only shows one construction in the domain model 300. The domain model 300 may include many constructions with various semantic patterns mapped to syntactic patterns. The set of M constructions in the domain model 300 may be represented by $\{C_1, C_2, \ldots, C_M\}$.

In one implementation, a system may be designed to host, maintain, and process domain models but provide a user interface for developers to design, modify, and update each domain model independent of other domain models. For example, the search server 106 in FIG. 1 may host a domain model. A developer of the model may be provided a tool to edit and establish the domain model locally on one of the client devices in FIG. 1 and then upload the model onto the server 106. Alternatively, the developer may directly edit the model in the server 106 remotely on one of the client devices of FIG. 1. A separate search interface, e.g., a webpage, may be provided by the search server (or an associated web server) such that a user may input search query from one of the client devices or mobile dives in FIG. 1 and the search server may receive the query and perform domain-based NLP.

In an NLP system based on multiple domains, an input text may first be assigned or classified into a subset of the domains by a domain classifier before further semantic processing. The classification process may include an input sequencer for breaking the input into substrings each being a smallest linguistic unit in a domain. The domain models discussed above may be an input into the sequencer.

Like NLP for semantic analysis within a domain, the domain classifier may be based on machine learning with bodies of expert annotated/labeled classification corpus. However, classification of some domains may not be amenable to standard machine learning techniques based on expert corpus due to, e.g., 1) lack of large amount of data to draw from for some "cold" domains;
2) high complexity in infrequent utterances (long tail of unique utterances with unique meanings);
3) lack of dedicated data scientists/linguists to build out domains;
4) frequent changes to a domain "under development" requiring constant retraining, or
5) mismatch in quantity of corpus data between multiple domains.

In various embodiments of this disclosure, the domain classifier is implemented without large corpus data external to the domain models or offline model building. Changes to scope and vocabulary of the model and additions to or subtractions of models from the collection of models can be reflected in real-time. The user may thus obtain real-time classification of query intent against those models, with a confidence score based on the relative strength of one model against another.

A corpus for each domain for the purpose of domain classification of an input query ("input query" is used interchangeably with "input text" or "input query text") may be constructed or updated based on the domain ontology and semantic construction rather than being developed from a large amount of annotated and labeled data by domain experts.

Figure 5:
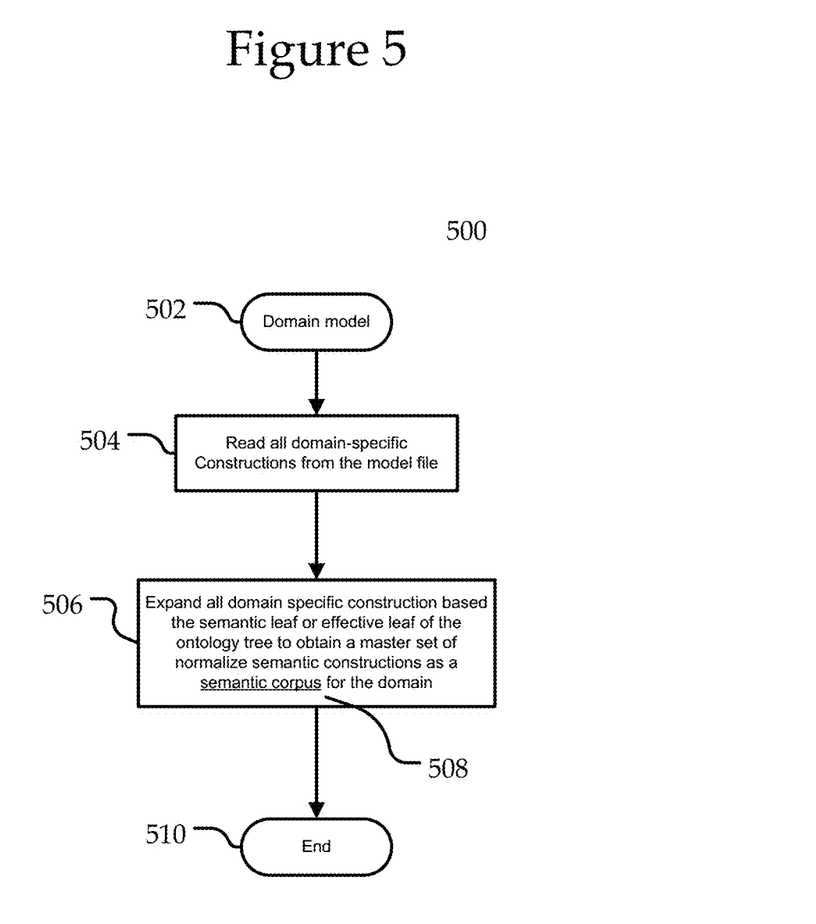
FIG. 5 shows a flow chart for deriving a semantic corpus for a domain from the domain model of FIG. 2.

FIG. 5 shows the first series of steps 500 in this process. At block 502, a domain model such as the domain model of FIG. 3 is input into the process. At block 504, all domain-specific semantic constructions $\{C_1, C_2, \ldots, C_M\}$ from the domain model are identified. Each of these domain-specific constructions may draw semantic tokens from various levels of the ontology hierarchy of FIG. 4. At block 506, the domain-specific constructions in the domain model are expanded to the leaf level of the domain-specific ontology to produce a master set of normalized semantic constructions as a semantic corpus for the domain. For example, $C_m$ (where m=1, 2, . . . , or M) may be a construction pattern with $k_m$ semantic elements. Each of the $k_m$ semantic elements is looked up in the domain-specific ontology. All the leaf level semantic tokens under each of the $k_m$ semantic elements of construction $C_m$ are identified. For example, there may be $j_1, j_2, \ldots, j_{km}$, leaf level semantic tokens in the ontology respectively under the 1st, 2nd, . . . , and $k_m$th semantic element of construction $C_m$. Each of theist, 2nd, . . . , and $k_m$th semantic element may be respectively expanded to any one of the $j_1, j_2, \ldots, j_{km}$, leaf level semantic tokens. Upon expansion of the semantic construction $C_m$, $j_1 \times j_2 \times \ldots \times j_{km}$ expanded constructions are generated. Such expansion may be performed for all the domain-specific semantic construction $C_1, C_2, \ldots,$ and $C_M$. The entire collection of the expanded constructions may be done in a normalized way. That is, the expansion for each semantic element in the constructions $C_1, C_2, \ldots,$ and $C_M$ may be extended to leaf levels or effective leaf as described above and in more detail below. The collection of expanded semantic constructions forms a master set of normalized semantic constructions 508 as a semantic corpus for the domain.

According to the process above, each of the expanded constructions within the master set contains a semantic pattern having a number of leaf-level or effective leaf-level semantic tokens of the domain (typically 2-5, determined by typical length of semantic pattern in the model construction $C_1, C_2, \ldots,$ and $C_M$). The example of semantic construction above, the length of the semantic pattern is 4.

In one implementation for building the domain master set of normalized semantic constructions, when the number of leaf level tokens for a semantic element in $C_1, C_2, \ldots,$ and $C_M$ is more than a predetermined number L, the parent token of those leaf tokens may be treated as an effective leaf and the expansion of the semantic constructions stops at that parent level. The purpose of this treatment is to limit the time it takes to compute the expanded master set of semantic constructions such that the performance of the entire query system is not significantly compromised in the case where a domain model is being frequently updated and the master set of semantic constructions for the domain are regenerated at each update. Additionally, this treatment may help limit the master set of semantic constructions to a reasonable corpus size such that the domain classification process to be described below may be carried out within a reasonable time. Thus, the predetermined number L may be predetermined based on factors such as the computing capability of the query system. In general, the number L may be as high as the computing power of the query system allows because the accuracy of the domain classification may depend on the levels of the ontology tree used in the expansion of semantic construction in forming the semantic corpus for the domain. In one implementation, effective leaf may be restricted to parent of true leafs to maintain accuracy of the model. Those of ordinary skill in the art understand that, in other implementations, an effective leaf may be at any level of the ontology tree as long as its number of children is above the predetermined number L. In some implementation, rather than a single number, L may be a set of predetermined numbers each for a different level in the ontology tree. For example, the parent of the deepest level in the ontology tree may be treated as an effective leaf when the number of the semantic tokens at that level is more than 1000, while the parent of the second deepest level in the ontology tree may be treated as an effective leaf when the number of direct categories under this parent is more than 100.

The master set of normalized semantic constructions form the semantic corpus constructed from the domain model itself. Since this semantic corpus may be regenerated in seconds (with the predetermined number L determined accordingly), it is immediately responsive to both small and large changes in the domain. Because of the way it is generated, and the relative length of the constructions (2 to 5 words) is also very compact.

Figure 6:
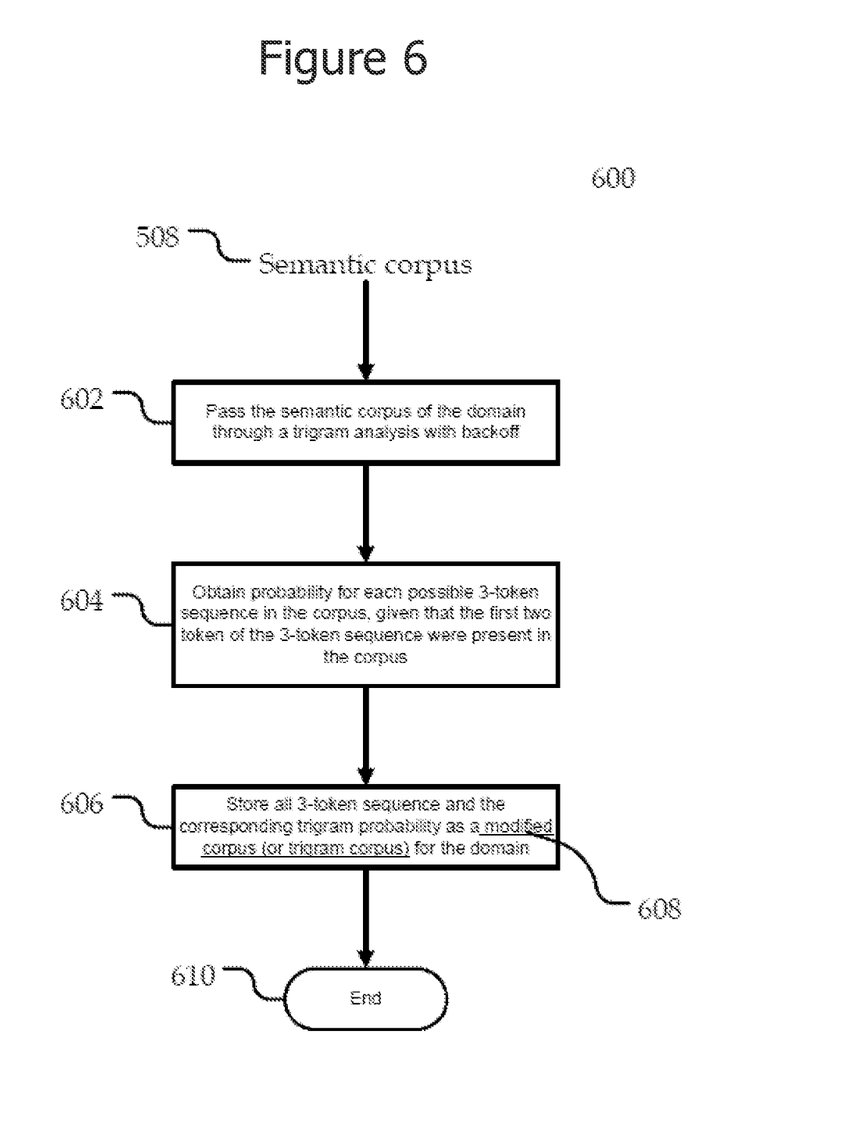
FIG. 6 shows a flow chart for obtaining a modified trigram corpus from the semantic corpus of FIG. 5.

As illustrated in the flow chart of FIG. 6, the semantic corpus 508 constructed above in accordance with the process of FIG. 5 may be further processed to form a modified semantic corpus 608 for the domain for domain classification. The modified semantic corpus is also simply referred to as "modified corpus" or "trigram corpus". The modified corpus 608 contains entries each comprising a trigram of tokens and a corresponding trigram probability. A trigram is a three consecutive token sequence contained in the semantic corpus 508, as will be described in more detail in the example below. The semantic corpus 508 is input into the process of FIG. 6. In block 602, the semantic corpus 508 is passed through a trigram analysis. The trigram analysis in effect extracts all trigrams, or all three-token sequences from all semantic constructions in the semantic corpus. The trigram analysis then determines the relative probability for each three-semantic token sequence in the semantic corpus 508, given that the first two tokens were present, as shown by block 604. In one exemplary implementation, a subset of trigrams is derived from each semantic construction in the semantic corpus 508. For example, a construction of the semantic corpus 508 may contain 5 sequential semantic tokens $t_1$, $t_2$, $t_3$, $t_4$, and $t_5$. The trigrams, or three-token sequences that may be derived from this construction may thus be $\{t_1, t_2, t_3\}$, $\{t_2, t_3, t_4\}$, and $\{t_3, t_4, t_5\}$. A set of trigrams for the semantic corpus may thus be derived from the entire set of expanded constructions in the semantic corpus 508. Each of these trigrams, without removal of duplicates may be used to build the modified corpus 608. Specifically, the modified corpus 608 may include all unique trigrams of the set of trigrams for the semantic corpus with duplicates. Each unique trigram forms one entry in the modified corpus 608. Each entry of unique trigram in the modified corpus 608 also includes a corresponding relative trigram probability of that entry. Trigram probability for each entry in the modified corpus 608 may be determined by counting the number (T) of trigrams in the entire set of trigrams for the semantic corpus having completely matching three-token sequence of the entry, and counting the number of the trigrams in the entire set of trigrams for the semantic corpus having matching first two tokens (B, representing the number of bigram count), and computing the ratio between the first number T and the second number B.

In one implementation of the trigram analysis and trigram probability derivation of step 602 and 604, backoff factors may be considered. A backoff factor is a numeric value that accounts for unobserved (in the modified corpus 608) but possible trigrams by weighting them on their bigram and unigram frequency. An unobserved trigram is a possible three token sequence based on the ontology but does not appear in the set of trigram or three-token sequence for the semantic corpus. By assigning trigram probability to the unobserved trigrams using the backoff factor, all possible trigrams of the ontology are accounted for. For example, when calculating the probability of an observed trigram entry E within the modified corpus 608, some predetermined backoff factor as a percentage is given to count for all other possible trigrams not in the modified corpus 608 but having matching bigram or unigram to E. In other words, the count T is revised downward by the backoff factor leading to the probability of E being reduced accordingly. The leftover probability (obtained by reducing the probability of observed trigrams) is allocated to unobserved but possible trigrams proportionally based on bigram frequency (if the last two tokens form a known bigram) or unigram frequency of the final token. The backoff percentage or factors may be set by taking sample collections of domains and validating the amounts that perform the best against a series of test queries.

In other implementations of the trigram analysis, probabilities for unobserved trigrams may be computed by other techniques known to those with skill in the art including linear interpolation.

In one implementation, the semantic tokens of the domain may include some special tokens that may carry no special types of semantic meanings. For example, in a text such as "email about 'dinosaurs'", the word "dinosaur" is no more than a text field. The domain may accordingly include a general "unknown" token in addition to those in FIG. 4 to represents things like text fields. Those of ordinary skill in the art understand that "unknown" is symbolic and any other word unmodeled in the ontology of FIG. 4 can be used as a token to represents text fields. Other special tokens may be additionally designed and included for the domain to represent custom fields, such as locations, dates, and time that may appear in the input text. Domains that include these fields in their constructions will contain these special tokens in the semantic corpus 508 and correspondingly in the modified corpus 608 (e.g. "Searchable From Time" or "Ticket To Location").

In a specific implementation for the construction of the modified corpus 608, each semantic construction containing a series of semantic tokens in the semantic corpus 508 may be amended with two symbolic "start" tokens preceding the first actual semantic token and one symbolic "end" token at the end of the series prior to being passed through the trigram analysis in bock 602. By doing so, each case where a token is the first or the second token and where a token is the last token in any semantic construction within the corpus 508 may be included as separate entries in the trigram. Probability for the resulting trigram entries in the modified corpus 608 that include the "start" or "end" symbolic tokens may be calculated in a way similar to the above. For example, the probability of trigram entry {"start", "start", $t_p$} may be calculated in block 604 of FIG. 6 as a ratio between the number of semantic constructions that begin with $\{t_p\}$ and the total number of constructions. For another example, the probability of the trigram {"start", $t_p$, $t_q$} may be calculated by in block 604 of FIG. 6 as a ratio between the number of trigrams that start with $\{t_p, t_q\}$ and the number of trigrams that start with $\{t_p\}$ in the entire trigram set of 608. Similarly, the probability of the trigram $\{t_p, t_q, \text{"end"}\}$ may be calculated by in block 604 of FIG. 6 as a ratio between the number of trigram $\{t_p, t_q, \text{"end"}\}$ and total number of trigrams that begin with $\{t_p, t_q\}$. The same backoff factors may be used in the calculations above.

The output of the block 604 above is thus a collection of every possible trigram that can be constructed from the tokens found in the semantic corpus 508 with each trigram in the collection having a corresponding trigram probability. The trigram and probability pairs may then be stored in block 606 as the modified corpus for the domain 608. This modified corpus for this domain is used together with modified corpus of other domains developed similarly as the basis for classifying an input query into an appropriate domain for further NLP.

Figure 7:
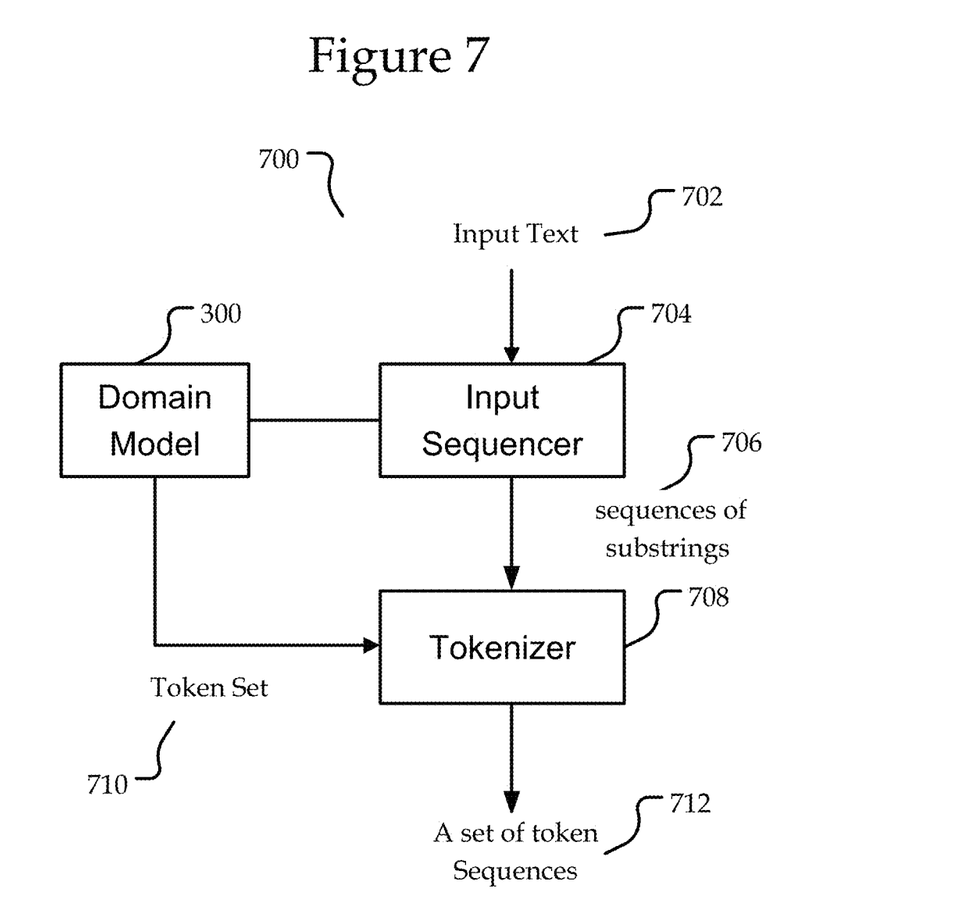
FIG. 7 illustrates a block diagram of a token sequencer for an input query.

When an input text sequence is received by the query system, it is passed to a token sequencer in each domain to be tokenized into one or more token sequences. FIG. 7 is a block diagram of a token sequencer 700 for a domain. Besides the domain model 300 discussed previously, the token sequencer 700 may further include a domain input sequencer 704 and a tokenizer 708. A domain model such as the domain model 300 illustrated in FIG. 3, including the ontology and the syntactic pattern information of the domain, is fed into the input sequencer 704. The input sequencer 704 is responsible for breaking the input text 702 into possible sequences of substrings 706. The input text 702 is herein interchangeably referred to as input query. Each substring in a sequence of substrings may contain one or more words and represents a smallest linguistic unit of the input query under the domain model. Some of the sequences returned by the sequencer will have fewer substrings than were present in input string as words, because some substrings will be sequenced to be multi-word substrings. In some implementation, the input sequencer 704 is also responsible for recognizing custom fields (special fields) such as location, time, and date and treating each of them as one sub string. A full parser for the domain may alternatively be used as the input sequencer 704 in some other implementation.

The sequences of substrings 706 of the input text as sequenced by the input sequencer 704 are then passed to the tokenizer 708. A set of tokens 710 from the ontology of the domain model 300 are also fed to the tokenizer 708. The token set 710 may be a subset of all tokens of the domain model. For example, the token set 710 may only include the leaf level or effective leaf level tokens discussed above for the expansion of the semantic constructions of the domain model. The token set 710 preferably further includes an "unknown" token as discussed previously. The token set 710 may additionally include special tokens for custom fields, such as a "time" token, a "date" token, and a "location" token, again as discussed previously.

Figure 8:
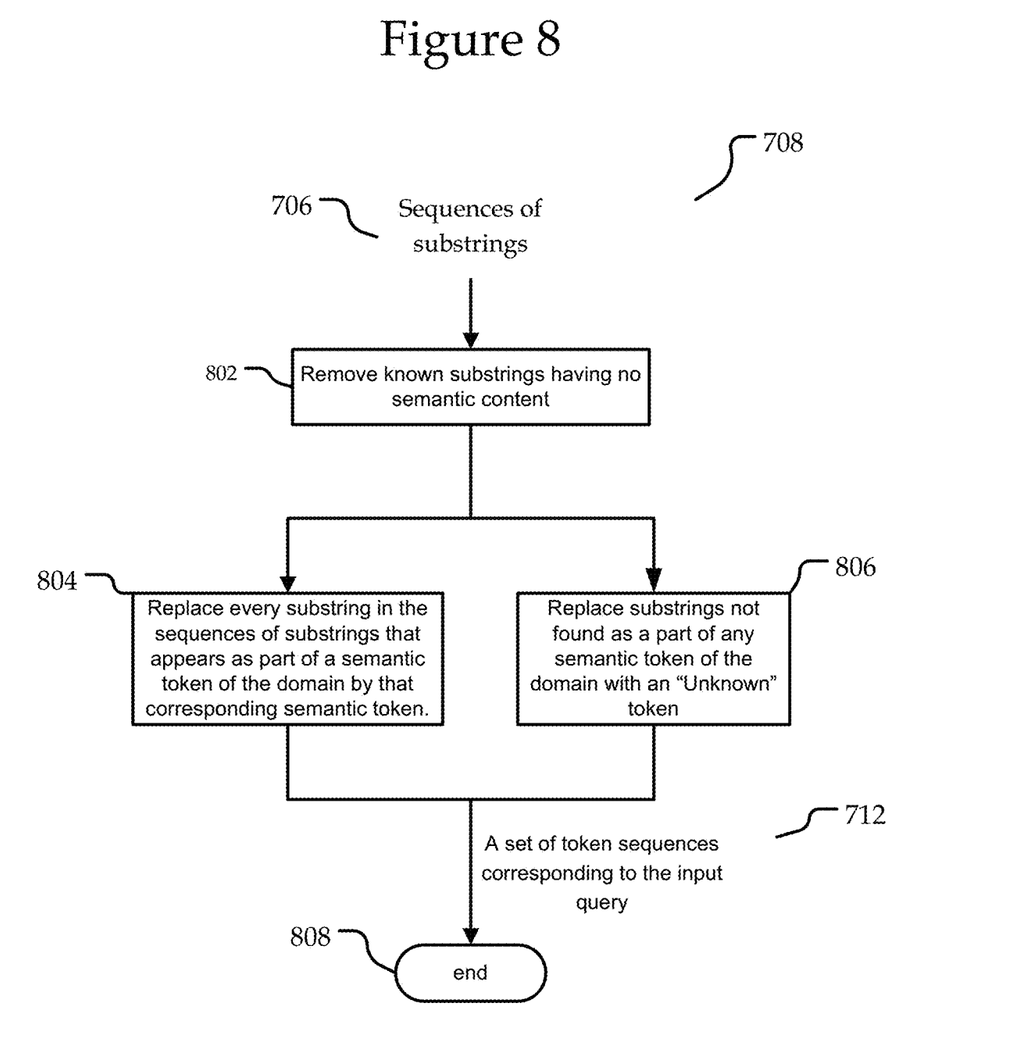
FIG. 8 shows a flow chart for the tokenizer of FIG. 7.

The tokenizer 708 receives the sequences of substrings 706 from the input sequencer 704 and the token set 710 from the domain model. The tokenizer is responsible for producing a set of token sequences 712 corresponding to the input text. An exemplary implementation of the tokenizer 708 is illustrated in the flow chart of FIG. 8. In block 802, the tokenizer removes known substrings having no semantic content from the sequences of substrings 706. These may be known words which have no meaning in the domain, and so are eliminated from consideration. This removal procedure provides the benefit of eliminating helper substrings like "that" and "are" in favor of semantically distinct items. After the removal procedure of block 802, each sequence of sub strings of the sequences of substrings may be represented by $\{S_1, S_2, \ldots S_n\}$ and each sequence of substrings is tokenized into one or more token sequences. Each of the substrings $S_1$ through $S_n$ of each sequence of substrings is looked up in the token set 710 of FIG. 7. All tokens matching the substring in the sequence of substrings are identified. The token set 710, as discussed earlier, preferably includes the "unknown" token. In block 804, a set of token sequences 712 are then produced for the input text by replacing each substring in each sequence of substring $\{S_1, S_2, \ldots S_n\}$ of the sequences of substrings with any one of the corresponding one or more tokens. However, if the token set 710 does not include the special "unknown" token, then an additional step shown in block 806 may be taken for replacing substrings that may correspond to no tokens in the token set 710 with an "unknown" token. This entire process of FIG. 8 may be done in real-time. Any of the resulting token sequence of the set of token sequences 712 may be represented by $\{T_1, T_2, \ldots, T_n\}$.

Figure 9:
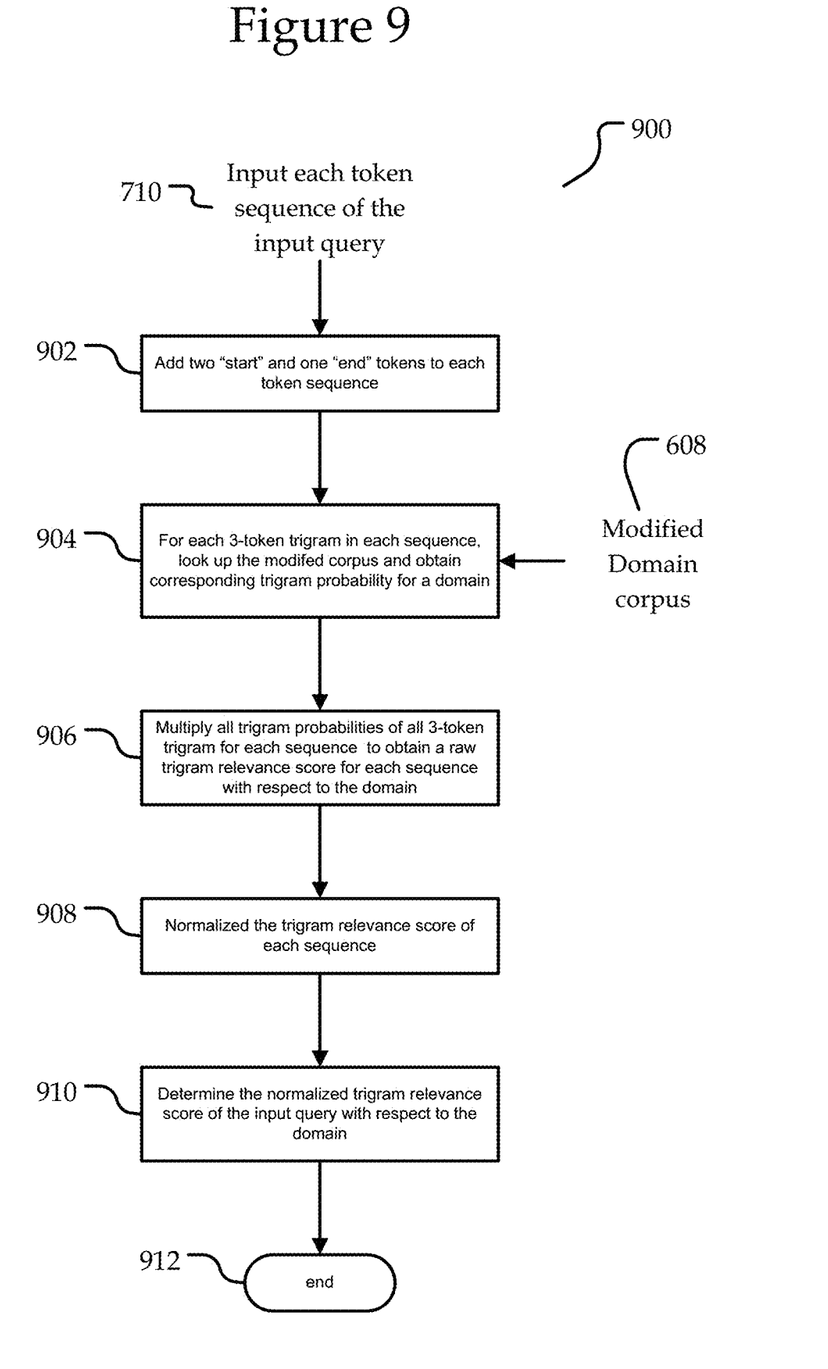
FIG. 9 shows a flow chart for evaluating relevance of a token sequence to a domain.

The set of domain token sequence 712 outputs by the token sequencer 700 for the input text may then be evaluated for its relevance to the domain, as illustrated by the flow diagram of FIG. 9. Generally, each of the token sequence of the set of token sequence 712 is looked up in the modified domain corpus 608 at trigram level and the corresponding trigram probabilities are processed to represent the relevance of the token sequence to the domain. In block 902 of the exemplary implementation of 900, two "start" tokens and an "end" token are amended to each token sequence of 712. Each amended token sequence thus may be represented by $\{$"start", "start", $T_1, T_2, \ldots, T_n$, "end"$\}$. In block 904, trigrams of each token sequence, $\{$"start", "start", T1$\}$, $\{$"start", $T_1, T_2\}$, $\{T_1, T_2, T_3\}$, $\{T_2, T_3, T_4\}$, ... $\{T_{n-2}, T_{n-1}, T_n\}$, $\{T_{n-1}, T_n, $"end"$\}$, are looked up in the trigram-probability pairs of the modified corpus 608. In block 906, trigram probabilities of all matched trigrams in the modified corpus 608 are multiplied together to obtain a raw trigram score for each token sequence of the set of token sequences 712 of the input query with respect to the domain.

In block 908, the raw trigram score for each token sequence within the domain is normalized to a normalized trigram score that may be later compared to the normalized score of the same input query for other domains. Normalization may be done in a combination of various ways to provide a relatively fair comparison between scores for different domains. For example, the raw score of a token sequence within a domain may be reduced if there are long sequences of "unknown" tokens. Long sequences of "unknown" tokens can produce artificially high scores. In one implementation, qth root of every probability is used as normalization where q is the number of tokens in the sequence minus the number of unknown tokens. Thus a three token sequence with 2 known items will get a larger boost than a 6 token sequence with 5 unknown items.

Alternatively or additionally for normalizing trigram score of a token sequence with respect to a domain, a relative factor is computed to counter the effects of differences in how probabilities are distributed within a model. For example, a model with 100 different semantic categories will have different conditional trigram probability distributions than a model with 15 semantic categories. In one implementation, a normalization factor is computed by taking the sum of all the conditional trigram probabilities, and dividing it by the sum of all conditional bigram probabilities. This process is done for each model, and it normalizes the relative weight a given conditional trigram probability will have based on the "density" of trigrams within the model.

In block 910, the normalized score for each token sequence for the input query within the domain are processed to obtain the normalized trigram score for the input query with respect to the domain. In one implementation, the maximum normalized score among the set of token sequences is taken as the normalized trigram score for the input text. In another alternative implementation, an average normalized score of the set of token sequences may be used as the normalized trigram score for the input text. Other implementations are also contemplated.

Figure 10:
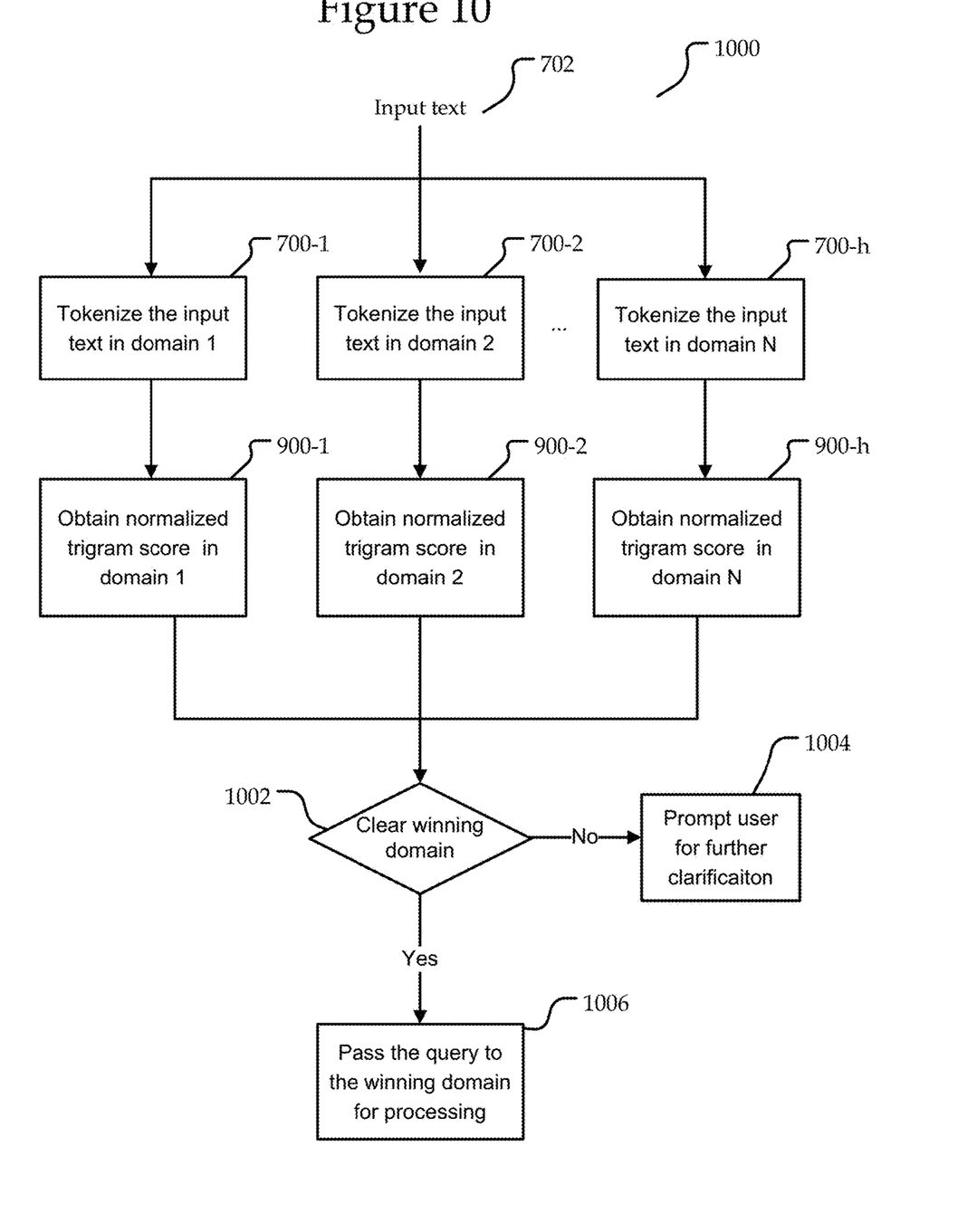
FIG. 10 shows a flow chart for classifying an input query into domains.

The above exemplary procedure for obtaining normalized trigram score for the input text may be performed for multiple domains and the comparison of the scores among various domains may be used as the basis for classifying the input text into the domains. This is illustrated by the flow chart of FIG. 10. In FIG. 10, the input text is tokenized in to sets of token sequences by domain 1, domain 2, . . . , and domain h at blocks 700-1, 700-2, . . . , and 700-h, respectively, following, for example, FIG. 7 and FIG. 8 discussed above. The set of token sequences for each domain is scored based on the pre-established modified corpus in block 900-1, 900-2, . . . , and 900-h, as described above in association with FIG. 9. The normalized trigram scores for all the domains may be compared in block 1002. If there is domain that clearly scores higher than any other domain by a predetermined margin, the input query may be classified as a query belonging to the winning domain at block 1006. However, if no domain scores more than any other domain by more than the predetermined margin, then the query system may determine that a classification of the input query is ambiguously. The query system may, for example, submit the query to multiple top scoring domains, or alternatively, may prompt user for further clarification of the input text.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for classifying an input query within multiple domains for natural language processing, the method comprising:
    defining a query model for a domain comprising at least an ontology having a set of semantic tokens organized in hierarchical levels, and a set of domain-specific semantic constructions each including one or more of the semantic tokens linked by one of a set of predefined grammatical relations;
    obtaining an expanded set of semantic constructions as a semantic corpus for the domain by replacing at least one of the semantic tokens of at least one of the semantic constructions of the query model with corresponding semantic tokens at a different hierarchical level in the ontology of the query model;
    performing a trigram analysis on the semantic corpus to obtain a trigram corpus for the domain comprising entries each corresponding to a trigram of three-token sequence appearing in the semantic corpus;
    obtaining an input query text from a remote device via a network connection;
    determining normalized relevance scores for the input query text corresponding to the multiple domains based on the input query text, query models of the multiple domains and trigram corpora of the multiple domains;
    classifying the input query text based on the normalized relevance scores; and
    transmitting, to the remote device, a communication comprising the input query text based on the classifying.

2. The method of claim 1, wherein obtaining the expanded set of semantic constructions as the semantic corpus for the domain comprises:
    determining effective leaf levels of the ontology;
    for a semantic construction of the set of domain-specific semantic constructions, identifying sets of effective leaf level semantic tokens, each set comprising effective leaf level tokens below a corresponding semantic token in the semantic construction in the hierarchical levels; and
    expanding the set of domain-specific semantic constructions into the semantic corpus by replacing each semantic token in the set of domain-specific semantic constructions with at least one effective leaf level semantic token.

3. The method of claim 2, wherein the ontology further comprises a set of customized tokens and a symbolic token representing an unknown linguistic element.

4. The method of claim 3, wherein the set of customized tokens comprising tokens representing at least one of time, date, or location.

5. The method of claim 1, wherein each expanded semantic construction in the semantic corpus for the domain further include two preceding symbolic start tokens and an appending symbolic end token.

6. The method of claim 1, wherein a trigram probability for each trigram entry in the trigram corpus is obtained with further consideration of a backoff factor accounting for other possible trigrams of the domain unobserved in the semantic corpus by weighting them on their bigram and unigram frequency.

7. The method of claim 1, wherein determining the normalized relevance scores for the input query text corresponding to the multiple domains comprises, for a domain of the multiple domains:
    sequencing the input query text into at least one sequence of substrings;
    tokenizing the at least one sequence of substrings into a set of token sequences comprising at least one token sequence with respect to the domain based on the ontology of the query model for the domain;
    obtaining a set of normalized relevance measures with respect to the domain, each normalized relevance measure corresponding to one token sequence of the set of token sequences of the domain based on trigrams appearing in the one token sequence and the trigram corpus of the domain; and
    determining, as one of the normalized relevance scores for the input query text corresponding to the multiple domains, a normalized relevance score with respect to the domain for the input query text based on the set of normalized relevance measures with respect to the domain.

8. The method of claim 7, wherein tokenizing the at least one sequence of substrings into a set of token sequences comprises:
    removing known substrings having no semantic content in the domain to obtain a redacted at least one sequence of substrings;
    obtaining the set of token sequences from the at least one sequence of substrings by replacing each substring with a matching semantic token from the ontology; and
    replacing each substring having no matching semantic tokens from the ontology with a predefined unknown token.

9. The method of claim 8, wherein each token sequence of the set of token sequences is further preceded with two symbolic start tokens and appended with one symbolic end token.

10. The method of claim 8, wherein obtaining one of the set of normalized relevance measures with respect to the domain corresponding to one token sequence of the set of token sequences comprises:
    obtaining a set of trigrams contained in the one token sequence;
    identifying entries in the trigram corpus of the domain matching each trigram in the set of trigrams contained in the one token sequence;
    obtaining a set of trigram probabilities in the trigram corpus corresponding to the identified entries;
    determining a relevance measure of the one token sequence with respect to the domain based on the set of trigram probabilities; and
    normalizing the relevance measure of the one token sequence to obtain the one of the set of normalized relevance measures with respect to the domain for the one token sequence of the set of token sequences.

11. The method of claim 10, wherein determining the relevance measure of the one token sequence with respect to the domain comprises multiplying together each trigram probability in the set of trigram probabilities.

12. The method of claim 10, wherein normalizing the relevance measure of the one token sequence to obtain the one of the set of normalized relevance measures comprises:
    obtaining a number of tokens in the one token sequence that are not unknown token; and
    obtaining the one of the set of normalized relevance measures based on the number.

13. The method of claim 7, wherein determining a normalized relevance measure with respect to the domain for the input query text comprises determining as the normalized relevance measure for the input query text a maximum relevance measure among the set of normalized relevance measures with respect to the domain each corresponding to one token sequence of the set of token sequences.

14. The method of claim 7, wherein determining a normalized relevance measure with respect to the domain for the input query text comprises determining as the normalized relevance measure for the input query text an average relevance measure among the set of normalized relevance measures with respect to the domain each corresponding to one token sequence of the set of token sequences.

15. A domain classification system for domain based natural language processing, comprising:
    memory storing:
        query models each for a domain of a set of domains and comprising at least an ontology having a set of semantic tokens organized in hierarchical levels, and a set of domain-specific semantic constructions each including one or more of the semantic tokens linked by one of a set of predefined grammatical relations; and
        computer executable instructions; and
    a processor in communication with the memory, and when executing the computer executable instructions, configured to implement:
        a receiving component configured to receive an input text from a remote device via a network connection;
        a set of domain relevance analyzer components corresponding to the set of domains configured to determine relevance scores for the input text with respect to the set of domains based on the input text, the query models, and trigram corpora;
        a classifier component configured to classify the input text based on the relevance scores with respect to the set of domains for the input text; and
        a component configured to transmit, to the remote device, a communication comprising the input text based on the classifying.

16. The domain classification system of claim 15, wherein the processor, when executing the computer executable instructions, is further configured to implement:
    a semantic construction expander component configured to obtain one expanded set of semantic constructions as semantic corpus for each domain by replacing at least one of the semantic tokens of at least one of the semantic constructions of a query model of the domain with corresponding semantic tokens at a lower hierarchical level in the ontology of the query model of the domain; and
    a trigram generator component configured to generate the trigram corpora by:
        generating trigrams for each domain based on an expanded set of semantic constructions for the domain; and
        obtaining trigram probabilities corresponding to trigrams for each domain.

17. The domain classification system of claim 15, wherein the set of domain relevance analyzer components further comprises:
    a set of input sequencer components for the input text corresponding to the set of domains and each configured for one domain to sequence the input text into sequences of substrings; and
    a set of tokenizer components corresponding to the set of domains for determining tokenized sequences for the input text, each configured to tokenize the sequences of substrings for one domain based on a query model of the one domain.

18. A computer readable medium storing computer executable instructions that when executed by a processor cause the processor to perform a method for classifying an input query within multiple domains for natural language processing, the method comprising:
    defining a query model for a domain comprising at least an ontology having a set of semantic tokens organized in hierarchical levels, and a set of domain-specific semantic constructions each including one or more of the semantic tokens linked by one of a set of predefined grammatical relations;
    obtaining an expanded set of semantic constructions as a semantic corpus for the domain by replacing at least one of the semantic tokens of at least one of the semantic constructions of the query model with corresponding semantic tokens at a different hierarchical level in the ontology of the query model;
    performing an analysis on the semantic corpus to obtain a corpus for the domain comprising entries each corresponding to a token sequence appearing in the semantic corpus;
    obtaining an input query text from a remote device via a network connection;
    determining relevance scores for the input query text corresponding to the multiple domains based on the input query text, query models of the multiple domains and corpora of the multiple domains;
    classifying the input query text based on the relevance scores; and
    transmitting, to the remote device, a communication comprising the input query text based on the classifying.

19. The computer readable medium of claim 18, wherein each expanded semantic construction in the semantic corpus for the domain further include two preceding symbolic start tokens and an appending symbolic end token.

20. The computer readable medium of claim 18, wherein the ontology further comprises a set of customized tokens and a symbolic token representing an unknown linguistic element.

* * * * *